June 18, 1935.    P. H. WILLIAMS    2,004,967
HOSE COUPLING
Filed July 24, 1934
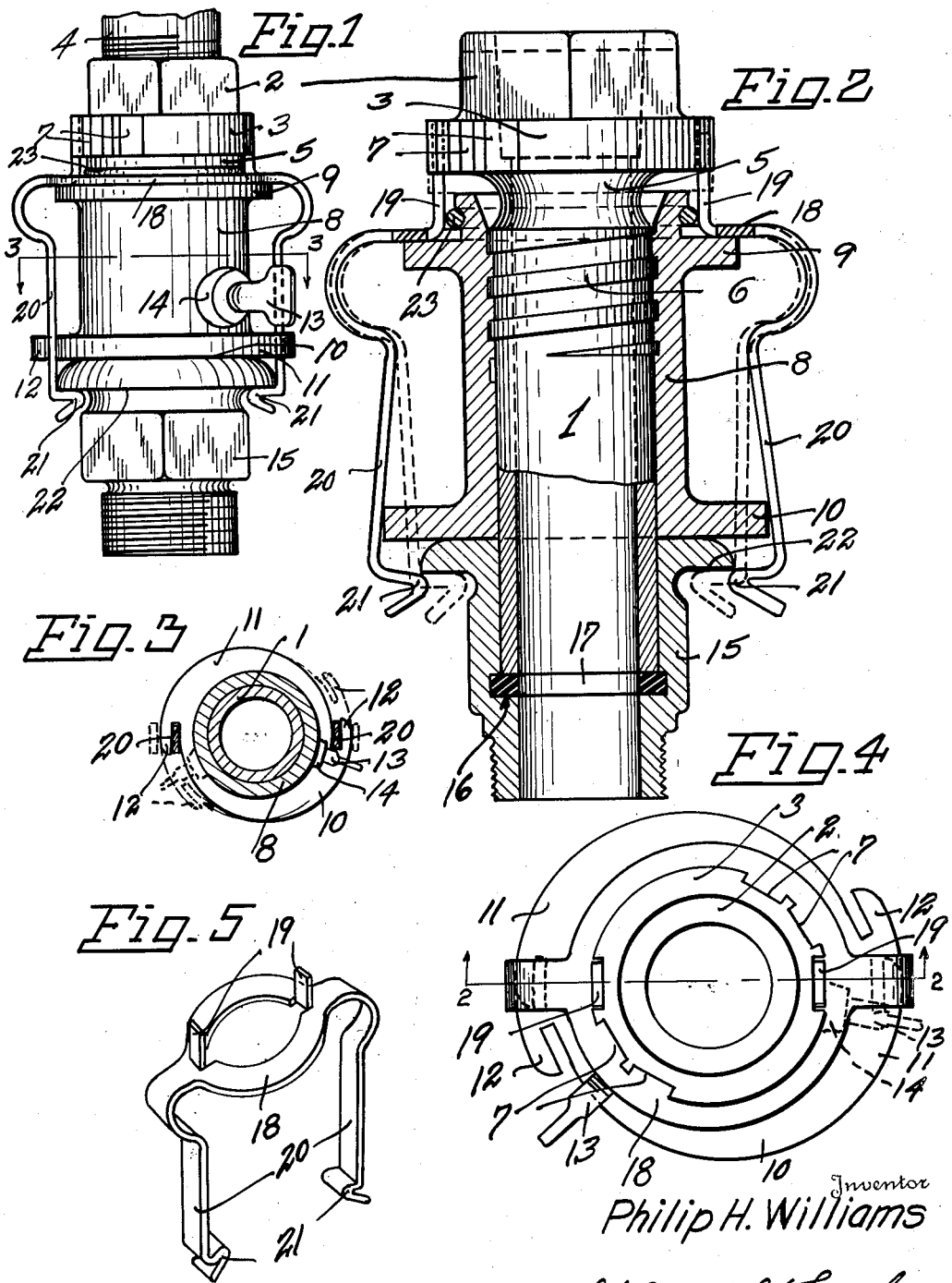
Inventor
Philip H. Williams
By Glenn L. Fish
Attorney Patented June 18, 1935

2,004,967

UNITED STATES PATENT OFFICE 2,004,967

HOSE COUPLING

Philip H. Williams, Spokane, Wash., assignor to Ideal Hose Coupling Company, Coeur d'Alene, Idaho Application July 24, 1934, Serial No. 736,701

5 Claims. (Cl. 285—174)

This invention relates to an improved hose coupling which may be employed to connect companion sections of a hose or as means for connecting a hose with a faucet or threaded end of a pipe.

One object of the invention is to provide a coupling of such construction that a hose may be securely connected with a faucet or companion hose section but permitted to be turned when in use without becoming twisted or worked loose from the faucet or companion hose section. Therefore, strain upon the fabric of the hose will be prevented and danger of leakage eliminated.

Another object of the invention is to provide a coupling consisting of elements so associated with each other that a tight joint will be formed and to permit of adjustments which will accommodate the elements to the thickness of a gasket used as a water seal and also compensate for wear.

Another object of the invention is to provide an improved fastener for detachably but securely holding a nipple forming part of the coupling in place.

Another object of the invention is to so form and mount the fastener that while it may be shifted longitudinally with a sleeve forming part of the coupling, it will be held against rotation with the sleeve when the sleeve is turned about the tubular body of the coupling and nipple engaging arms of the fastener shifted into and out of engagement with the nipple by cams formed upon the sleeve when the sleeve is turned.

Another object of the invention is to provide a coupling which is simple in construction, strong and durable, and very easy to assemble or take apart.

The invention is illustrated in the accompanying drawing, wherein:—

Fig. 1 is a side elevation of the improved coupling.

Fig. 2 is an enlarged section taken longitudinally through the coupling along the line 2—2 of Fig. 4.

Fig. 3 is a section taken along the line 3—3 of Fig. 1.

Fig. 4 is an end elevation of the coupling.

Fig. 5 is a perspective view of the nipple engaging fastener forming part of the coupling.

This improved hose coupling has a tubular body 1 formed of strong metal and at one end the body is enlarged to form an internally threaded socket 2 having an outstanding collar 3 at its base. The socket has wrench engaging faces and therefore can be screwed tightly upon an element 4 which may represent a portion of a faucet or hose terminal. Below the collar the body is reduced, as shown at 5, and immediately adjacent this reduced portion the body is externally threaded as shown at 6. Opposed portions of the collar are formed with sets of recesses 7 leading from the peripheral edge face of the collar and serving a purpose to be hereinafter set forth.

A sleeve 8 fits snugly about the tubular body with the lower portion of the body projecting from the sleeve and upper and lower portions of the sleeve are formed with outstanding annular flanges 9 and 10, the lower one of which is shaped to define cams 11 and bills 12. The upper portion of the sleeve is internally threaded to engage the threads of the body and not only hold the sleeve upon the body but also permit longitudinal adjustment of the sleeve relative to the body. A detachable handle 13 is threaded into a boss 14 and provides a means for turning the sleeve 8 about the body 1, thus applying pressure on the gasket 17. The handle 13 extends outward to provide a stop against the spring grapple arms 20 to prevent over travel of the sleeve. The screw handle 13 is made removable to permit adjustment of the disc 18 which carries the grapple members 20. By removing the handle 13 it is possible to turn the sleeve past its normal stop position in either direction and to back it down until the engaging prongs 19 on the disc can be rotated to another notch 7 on the adjusting flange 3 to adjust the tension on the gasket.

A nipple 15 having an internal seat 16 to support a gasket 17 fits about the projecting lower portion of the body with its upper end bearing against the lower end of the sleeve. This nipple is rotatably and slidably engaged with the body and has its lower portion externally threaded for engagement in a hose terminal, wrench engaging faces being formed upon the nipple as shown in Fig. 1 so that it may be tightly screwed into the hose terminal. By adjusting the sleeve longitudinally upon the body the extent to which the body projects from the sleeve can be regulated and proper pressure applied by the lower end of the body upon the gasket to form a water tight joint when the nipple is slid into place and secured with its upper end abutting the sleeve.

In order to securely but detachably hold the nipple in place there has been provided a fastener constructed as shown in Fig. 5. This fastener is formed of resilient sheet metal and consists of a disk 18 having tongues 19 and arms or grapples 20 projecting therefrom. Upper portions of the arms are bowed to increase their resiliency and their lower ends are bent to form hooks 21 which engage under an outstanding flange 22 at the upper end of the nipple and firmly hold the nipple against the sleeve with the gasket compressed by the body. Resiliency of the arms holds them in contact with the marginal edges of the cams 11 and therefore when the sleeve is rotated about the body the hooked ends of the arms will be shifted into or out of position to engage under the flange of the nipple according to the direction in which the sleeve is turned. When the hooks are engaged under the flange of the nipple the arms will be overlapped by the bills 12 as shown in full lines in Fig. 3 and danger of the hoops accidentally slipping out of engagement with the nipple eliminated. Therefore, the nipple cannot accidentally slip along the body and permit leakage due to insufficient pressure upon the gasket. It is necessary that the fastener be prevented from turning about the body with the sleeve and in order to do so the tongues 19 are engaged in selected ones of the recesses 7 formed in the collar 3. These tongues prevent the fastener from turning with the sleeve but may slide through the recesses and therefore the fastener and sleeve can be shifted as a unit longitudinally of the body by action of the threads when the sleeve is turned about the body. In order to hold the disk firmly against the upper face of the flange 9 there is employed a ring 23 which fits tightly about the sleeve above the upper flange and bears against the disk. As the ring fits into a groove formed in the sleeve there will be no danger of it slipping off the upper end of the body.

When this coupling is in use the socket at the upper end of the body is screwed upon a faucet or hose terminal and the nipple screwed into a hose socket. The nipple is then slid into place upon the lower portion of the body and the sleeve then turned to cause the arms to shift inwardly and their hooks engage under the flange of the nipple where they will be firmly held by the bills 12 moving into overlapping engagement with the arms. The nipple will thus be securely held upon the body but may turn about the same and prevent a hose from becoming twisted or the coupling worked loose from a hose or faucet. If it is found that proper pressure is not applied to the gasket to form a tight joint, it is merely necessary to release the nipple and rotate the sleeve in a direction to shift it upwardly upon the body. The nipple can then be again secured and as the body will project a greater distance from the sleeve sufficient pressure will be applied to the gasket to form a tight joint. The handle serves for facilitating rotation of the sleeve and when secured in position against the grapple arms the pressure and friction exerted on the threads within the sleeve hold it stationary and prevent the sleeve from slipping out of position.

Having thus described the invention, what is claimed is:

1. In a hose coupling, a tubular body having attaching means at its upper end and adjacent the said end being externally threaded, an outstanding collar being provided between the attaching means and the threaded portion and formed with seats in its peripheral edge face, a sleeve fitting about said body and internally threaded to engage threads of the body and mount the sleeve for adjustment longitudinally of the body, said sleeve having flanges at its upper and lower ends and above the upper flange being formed with a circumferentially extending groove, the lower flange constituting a cam, a handle to revolve the sleeve upon the body, said body having its lower portion projecting from the lower end of said sleeve, a nipple fitting about the projecting lower end portion of said body and abutting the lower end of said sleeve, said nipple having an internal seat formed therein, a gasket resting upon said seat with the lower end of said body in compressing engagement therewith, a disk resting upon the upper flange, tongues extending upwardly from said disk and engaged in the sides of said collar, a ring fitting about said body and resting upon said disk to hold the disk upon the upper flange, and resilient arms extending downwardly from said disk across the marginal edge of the cam forming lower flange with their lower ends bent to form hooks for engaging under an outstanding flange of said nipple to hold the nipple in place about the lower portion of said body.

2. In a hose coupling, a tubular body, a sleeve rotatable about said body, a nipple engaged about one end portion of said body and having a flanged end abutting the sleeve, a disk bearing against the other end of said sleeve having resilient arms extending along the sleeve and terminating in hooked ends projecting from the sleeve to engage the flanged end of said nipple and hold the nipple in place, means extending from said disk and engaging said body to prevent rotation of the disk with the sleeve, and a cam carried by said sleeve and engaging said arms to shift the hooked ends thereof into and out of engagement with the nipple when the sleeve is turned.

3. In a hose coupling, a tubular body, a sleeve rotatable about said body with ends of the body projecting from upper and lower ends of the sleeve, a nipple engaged about the lower end portion of said body and abutting said sleeve, a collar carried by the upper end portion of said body, a disk fitting about said sleeve and having tongues engaging said collar to prevent rotation of the disk with the sleeve, grapples extending from said disk for engaging said nipple, and a cam carried by said sleeve and engaging said grapples for moving the grapples into and out of engagement with the nipple when the sleeve is rotated.

4. In a hose coupling, a tubular body, a sleeve rotatable about said body with ends of the body projecting from upper and lower ends of the sleeve, a nipple engaged about the lower end portion of said body and abutting said sleeve, a collar carried by the upper end portion of said body, upper and lower flanges carried by said sleeve, a disk fitting against the upper flange, tongues extending upwardly from said disk and engaged in seats formed in said collar to prevent rotation of the disk with the sleeve, and arms extending from said disk along the sleeve with their lower ends projecting therefrom and formed with hooks to engage said nipple, the lower disk being shaped to define a cam for shifting the hooked ends of the arms towards and away from the nipple when the sleeve is rotated.

5. In a hose coupling, a tubular body, a sleeve rotatable about said body with ends of the body projecting from upper and lower ends of the sleeve, a nipple engaged about the lower end portion of said body and abutting said sleeve, a collar carried by the upper end portion of said body, upper and lower flanges carried by said sleeve, a disk fitting against the upper flange, tongues extending upwardly from said disk and engaging said collar to prevent rotation of the disk with the sleeve, the portion of the sleeve above the upper flange being externally grooved, a ring fitting about said sleeve and engaged in said groove, said ring bearing against said disk to hold the disk against the upper flange, and resilient arms extending from said disk along said sleeve and having hooked free ends projecting from the lower end thereof to engage said nipple and hold the nipple in place, the lower flange being shaped to define cams engaging said arms to shift the hooked ends thereof into and out of engagement with the nipple when the sleeve is rotated.

PHILIP H. WILLIAMS.